Nov. 29, 1960     M. N. BRILLIS ET AL     2,962,201
PAPER COFFEE CUP
Filed Aug. 13, 1958
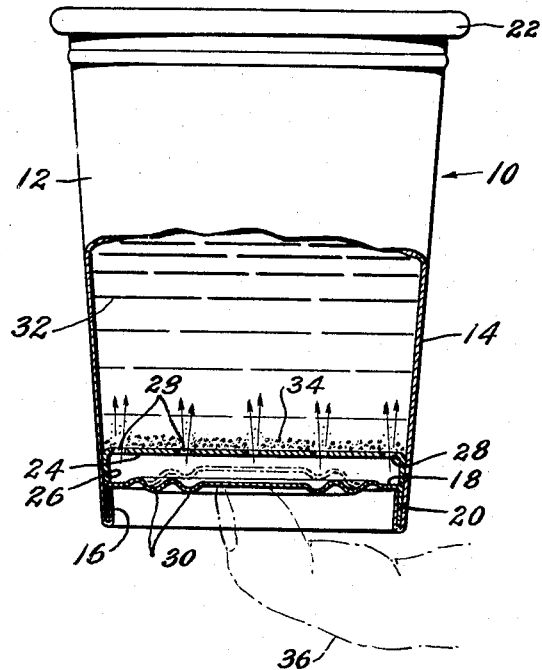
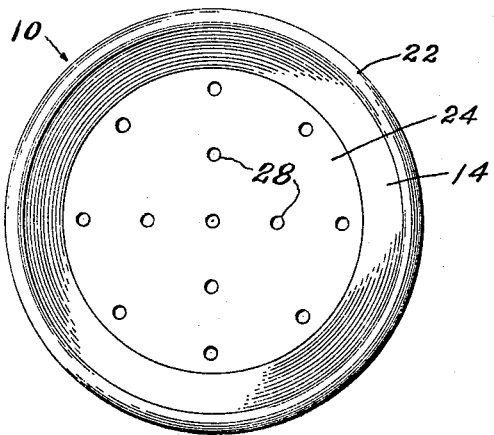
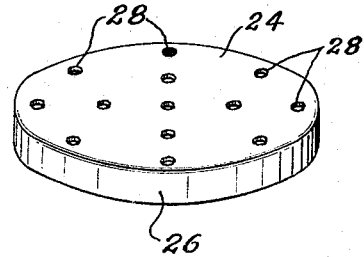
INVENTORS
MICHAEL N. BRILLIS
FRANK POLLICK
BY
Edw. S. Higgins
ATTORNEY

United States Patent Office 2,962,201
Patented Nov. 29, 1960

2,962,201
PAPER COFFEE CUP

Michael N. Brillis, 124 Riverdale Ave., and Frank Pollick, 439 Bellevue Ave., both of Yonkers, N.Y.

Filed Aug. 13, 1958, Ser. No. 754,847

1 Claim. (Cl. 229—1.5)

This invention relates to new and useful improvements in paper coffee cups.

When coffee is served in paper cups it is customary and necessary to supply a spoon for the purpose of stirring the sugar if and when sugar is used to sweeten the coffee. There are occasions when a spool is not available or when it is not convenient or handy to supply a spoon. With this in view, it is the prime object of the present invention to provide a paper coffee cup that needs no spoon for stirring the sugar.

It is another object of the invention to provide a paper coffee cup with a bellows pump embodied in the cup for stirring the sugar placed in the coffee.

A further object of the invention is to provide a paper coffee cup with a stirrer for the sugar that is highly efficient in operation, simple in construction and economical to manufacture.

For further comprehension of the invention and of the objects and advantages thereof, reference will be had to the accompanying drawing forming a material part of this disclosure wherein—

Fig. 1 is a side elevational view partly in section of a paper coffee cup embodying the present invention showing coffee and suger therein and a finger of the user in pumping position in dash lines.

Fig. 2 is a top plan view of the cup.

Fig. 3 is a perspective view of the baffle plate.

Referring in detail to the drawing, a paper coffee cup made in accordance with the present invention is shown in Fig. 1 and is designated by the reference numeral 10. The coffee cup comprises a cylindrical tapered body 12 formed of cardboard or pasteboard or similar semi-rigid paper and includes a side wall 14. The bottom end of the side wall is turned inwardly upon itself forming a flange 16 and forming a support for a bottom wall 18 which rests upon the top edge of the flange 16. The bottom wall 18 has a flange 20 interposed between the bottom of the side wall and the flange 16. The body 12 is open at the top and is formed with a bead 22 thereat.

In accordance with the present invention, a false bottom in the form of a baffle plate 24 is secured in the body slightly spaced upwardly from the main bottom wall 18. The baffle plate 24 is formed with a peripheral flange 26 which is secured to the inner surface of the side wall 14 in any suitable manner. A number of small spaced openings 28 are formed in the baffle plate adjacent the periphery thereof and around the center thereof, thirteen of such openings being shown.

The main bottom wall 18 is formed with spaced concentrically arranged annular or circular outwardly projecting protuberances 30 from the periphery of the plate inwardly to a point remote from the center whiich is free of such protuberances. These protuberances 30 convert the bottom main wall 18 into a bellows or diaphragm for coaction with the openings 28 in the baffle plate 24 for agitating the liquid coffee in the cup.

In using the improved paper coffee cup, the liquid coffee 32 is poured into the cup and the sugar, indicated at 34, in Fig. 1, is placed on the false bottom in any suitable manner for sweetening the coffee. The bottom of the cup may then be grasped by the fingers of the one hand and with one of the fingers thereof, such as indicated at 26, the center of the diaphragm 18 is pressed inwardly, the pressure released momentarily and applied again, the finger acting with a pumping action. This operation causes the coffee to be pumped upwardly through the openings 28 in the baffle plate 24 and alternately sucked downwardly therethrough in repeated operations, thereby causing eddies in the coffee and agitating the coffee and thus stirring up the sugar 34 on the false bottom 24 until it dissolves.

It will be noted that the short strokes of the diaphragm 30 coupled with the few and small openings in the baffle plate 24 cause high velocity jets of coffee to be pumped through the openings creating eddies in the coffee and agitating the coffee thereby dissolving the sugar in the coffee.

While we have illustrated and described the preferred embodiment of the invention it will be understood that variations thereof may be made without departing from the principle of the invention.

We claim:

A paper coffee cup comprising a hollow cylindrical tapered body having a side wall, a main transverse bottom wall fixed to the side wall and being open at the top, and a false bottom spaced over and inwardly slightly from the main bottom wall, said false bottom having its periphery fixed to the side wall and having spaced openings therein, the main bottom wall having spaced annular concentrically arranged protuberances extending into the interior of the body adapted to provide a bellows action when actuated by a finger of the user whereby liquid coffee in the body is pumped in the body through the openings in the false bottom thereby agitating the coffee whereby sugar on the false bottom is stirred and dissolved, the spacing of the main and false bottoms and the spacing and size of the openings in the false bottom being such that high velocity jets of liquid coffee are pumped through the openings in the false bottom, during the pumping operation by the hand of the user.

References Cited in the file of this patent

UNITED STATES PATENTS

| Number | Name | Date |
|---|---|---|
| 292,695 | Shive | Jan. 29, 1884 |
| 2,203,479 | Witwer | June 4, 1940 |
| 2,446,967 | Sykes | Aug. 10, 1948 |
| 2,555,756 | Muelhaus | June 5, 1951 |
| 2,673,496 | Amberg et al. | Mar. 30, 1954 |